US005794375A

United States Patent [19]
Wright

[11] Patent Number: 5,794,375
[45] Date of Patent: Aug. 18, 1998

[54] FISHING ROD RETAINERS

[76] Inventor: Michael D. Wright, 4849 N. 18th St., Milwaukee, Wis. 53209

[21] Appl. No.: 716,968

[22] Filed: Sep. 20, 1996

[51] Int. Cl.$^6$ ............................................. A01K 87/00
[52] U.S. Cl. ............................................ 43/25; 43/25.2
[58] Field of Search .................................... 43/25, 25.2

[56] References Cited

U.S. PATENT DOCUMENTS

| | | | |
|---|---|---|---|
| 2,816,393 | 12/1957 | Kmonk | 43/55 |
| 3,113,363 | 12/1963 | Fyvie | 24/257 |
| 3,169,290 | 2/1965 | Snodgrass | 43/25 |
| 3,425,150 | 2/1969 | Braese | 43/25.2 |
| 3,832,796 | 9/1974 | Cardwell | 43/25 |
| 3,992,799 | 11/1976 | Oakes | 43/25 |
| 4,265,046 | 5/1981 | Keith | 43/21.2 |
| 4,707,892 | 11/1987 | Nelson | 24/336 |
| 4,873,780 | 10/1989 | Lancette | 43/25.2 |
| 5,586,404 | 12/1996 | Freitas | 43/21.2 |

*Primary Examiner*—J. Woodrow Eldred
*Attorney, Agent, or Firm*—Whyte Hirschboeck Dudek, S.C.

[57] ABSTRACT

A pair of fishing rod retainers is disclosed for storing and transporting a disassembled fishing rod in a compact manner where each of the disassembled sections are placed adjacent and parallel to the main section. The invention includes a pair of retainers, with one retainer permanently attached to each end of the main section of the fishing rod. The retainers have a number of openings that correspond to the number of sections of the fishing rod such that each section may be laid adjacent and parallel to the main section and inserted into its respective opening in the retainers. Since the retainers are permanently attached to the main section, they cannot be lost or misplaced and the fishing rod is conveniently disassembled for storage and transport. Since the rod sections are placed end over end, the fragile tip of the rod is protected by being in close proximity to the much heavier handle. The retainers can be inexpensively manufactured so that they can be used permanently on every rod in a collection.

11 Claims, 1 Drawing Sheet

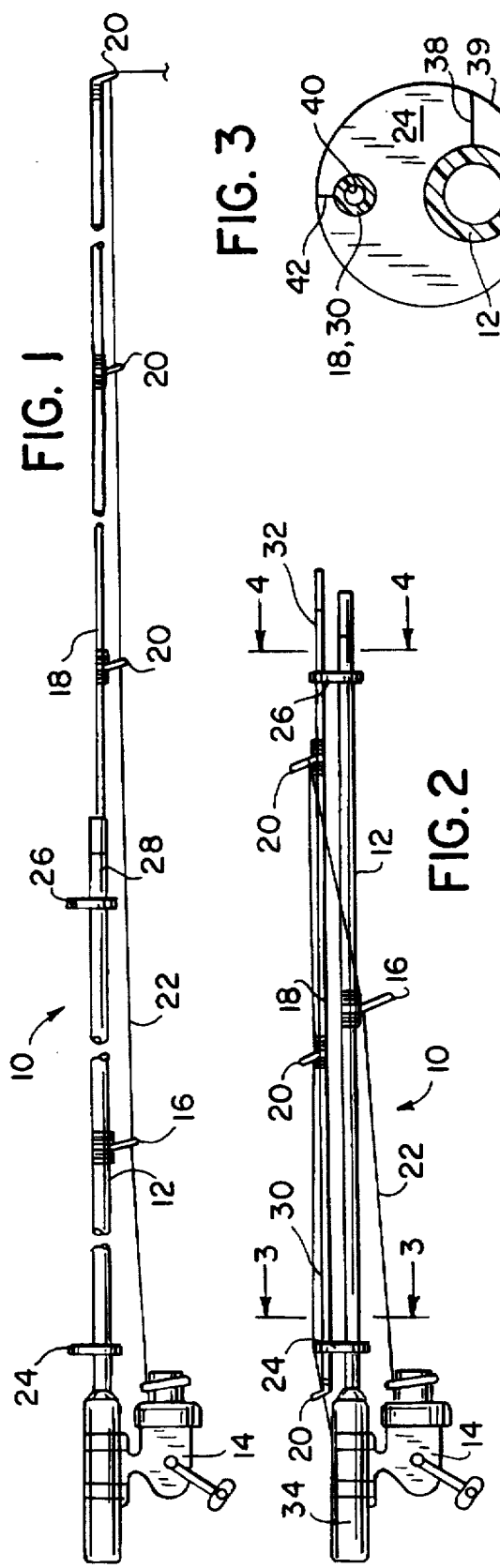
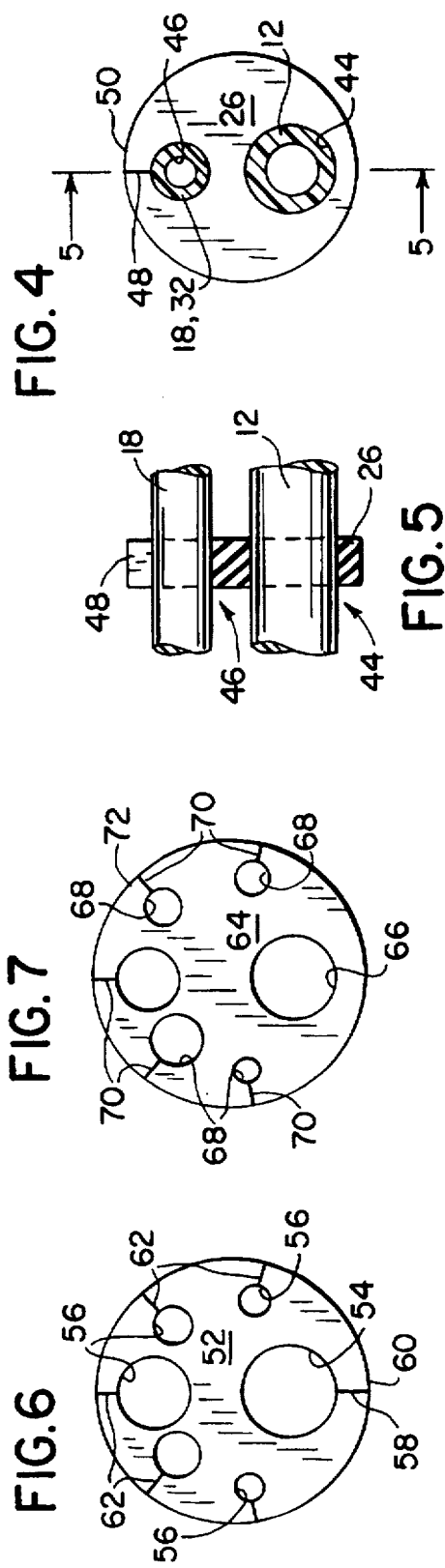

5,794,375

1

FISHING ROD RETAINERS

BACKGROUND OF THE INVENTION

The present invention relates generally to fishing apparatus, and more particularly to retainers for storing and transporting a disassembled multi-sectioned fishing rod.

It is common for multi-sectioned fishing rods to extend six to eight feet, and sometimes much further when assembled. It is therefore difficult to transport such fishing rods, and storage takes up an extreme amount of space. As a result, these fishing rods are usually disassembled before transporting and storing. Further, the tips of the rods are rather fragile, and can be damaged if transported and stored assembled, or if disassembled, can be damaged if not firmly secured. Since the fishing line is threaded through a series of eyelets and has a hook, leader, or other attachment tied to the end of the fishing line, it is very inconvenient to untie the attachment and unthread the fishing line from the eyelets. As a result, the fishing rod is disassembled and folded end over end with the fishing line remaining threaded though each of the eyelets. When transporting and moving the disassembled fishing rod in this condition, the fishing line often becomes entangled with the other disassembled sections creating a nuisance every time the rod is to be reassembled.

Therefore, there is a need for an improved method of retaining the fishing rod sections to one another so that the line does not become tangled and the rod can be easily and quickly assembled. Previous attempts have been made at providing such retainers, but have had undesirable qualities. That is, most retainers must be removed from the fishing rod when the rod is assembled for use. This typically results in the retainers being misplaced or lost, and cannot be conveniently located when needed. Another disadvantage is the cost of the prior devices—some are unnecessarily complex and expensive to produce.

It would therefore be desirable to have fishing rod retainers that are permanently attached to the main section of the fishing rod so that they are immediately available whenever it is desired to disassemble the rod, and for retainers that are inexpensively produced.

SUMMARY OF THE INVENTION

The present invention overcomes the aforementioned problems in providing retainers for storing and transporting a disassembled multi-sectioned fishing rod, wherein one section of the fishing rod is disengageable from a main section, and each section is capable of adjacent and parallel alignment with the main section of the rod. The retainers include a first retainer having multiple openings, where one opening is capable of receiving the main section of the fishing rod between the reel and the first fishing line eyelet. The first retainer has at least one other opening in which another section of the fishing rod can be inserted. The invention also includes a second retainer, also having a number of openings. A main opening in the second retainer is capable of receiving the main section, and at least one other opening is capable of receiving the other end of the disassembled section of the fishing rod.

The retainers are capable of being permanently mounted to the main section of the fishing rod and do not interfere with normal use of the fishing rod when assembled. The retainers are supplied with slits from the openings to the outer edge so that the disassembled sections can easily be inserted into the retainers, and likewise, be easily removed.

The retainers are made of pliable rubber which not only allows easy insertion and extraction of the disassembled

2 sections, but also firmly grip the main section so they do not loosely slide on the shaft of the fishing rod during normal use. Further, since the uniquely designed retainers of the present invention are inexpensive to produce, a set may be purchased for every rod in a collection.

Another distinct benefit of the present invention is that when the disassembled sections are laid end over end and firmly affixed to the main sections with these retainers, the fragile tip of the rod is placed over the handle and is then inherently protected from damage during transport and storage.

Various other features, objects, and advantages of the present invention will be made apparent from the following detailed description and the drawings.

BRIEF DESCRIPTION OF THE DRAWINGS

The drawings illustrate the best mode presently contemplated for carrying out the invention. In the drawings:

FIG. 1 shows a partial side view of an assembled multi-sectioned fishing rod showing the retainers of the present invention attached to the main section of the fishing rod.

FIG. 2 is a side view of a disassembled multi-sectioned fishing rod in a storage and transport position according to the present invention.

FIG. 3 is a front view taken along line 3—3 of FIG. 2 of one retainer of the present invention.

FIG. 4 is a front view taken along line 4—4 of FIG. 2 of another retainer of the present invention.

FIG. 5 is a cross-sectional view taken along line 5—5 of FIG. 4.

FIG. 6 is a front view of another embodiment of the retainer of FIG. 3.

FIG. 7 is a front view of another embodiment of the retainer of FIG. 4.

DETAILED DESCRIPTION OF THE PREFERRED EMBODIMENT

As shown in FIG. 1, an assembled multi-sectioned fishing rod 10 has a main section 12 having a reel 14 mounted on one end and having at least one eyelet 16. Fishing rod 10 also has at least one disengageable section 18 having a plurality of eyelets 20. Fishing line 22 is released and retracted by reel 14 and threaded through eyelets 16 and 20, as is all commonly known. Fishing rod 10 has a first retainer 24 located between reel 14 and the first eyelet 16 of the main section, and a second retainer 26 located near the opposite end 28 of the main section 12 of fishing rod 10.

As shown in FIG. 2, the multi-section fishing rod 10 is shown disassembled in a storage and transport position. Section 18 is shown withdrawn from main section 12 and laid end over end such that it is in adjacent and parallel alignment with main section 12. The first retainer 24 is capable of receiving the far end 30 of section 18, and the second retainer 26 is capable of receiving the mating end 32 of section 18, such that every section of the multi-section fishing rod 10 is held firmly together for storage and transport without the need to unthread fishing line 22. Where fishing rod 10 has a rubber or cork handle 34, a hook (not shown) at the end of line 22 may be embedded into handle 34 for safe transport.

FIG. 3 shows a detailed view of the first retainer 24 having a main section opening 36 to accommodate main section 12 therein. A slit 38 extends from the opening to an outer edge 39 of the first retainer 24 and is provided to place retainer 24 over main section 12 without the need of removing fishing line 22, FIG. 2, from the eyelets 16 and 20. It is contemplated that after the initial insertion of fishing rod main section 12 into opening 36, that slit 38 be permanently sealed so that retainer 24 is permanently attached to fishing rod 10. In this manner, the retainer is not lost or misplaced, and is easily available for disassembly, storage, and transport. Slit 38 may be sealed by gluing, stapling, or any other available method.

Referring back to FIG. 3, a second opening 40 is provided to receive the far end 30 of section 18 therein. A slit 42 is provided for inserting section 18 and extends from the opening to an outer edge 39 of the first retainer 24.

FIG. 4 shows the second retainer 26 in a detailed front view. The second retainer 26 has a main section opening 44 for receiving main section 12 therethrough. A second opening 46 is provided with slit 48 extending from opening 46 to an outer edge 50 for receiving mating end 32 of section 18 therein, as previously described.

FIG. 5 shows a cross-sectional view taken along line 5—5 of FIG. 4. Retainer 26 has openings 44 and 46 shown with main section 12 and section 18 therein, respectively. Since retainer 26 is slid over the end of the main section 12, no slit is necessary for opening 44. Slit 48 allows easy insertion and removal of section 18 from retainer 26.

FIGS. 6 and 7 show an alternate embodiment of the present invention for use with fishing rods having more than two sections, such as fly rods and 3—4 piece casting and spinning rods. As is readily apparent, FIG. 6 shows a first retainer 52 having a main opening 54 and a plurality of section openings 56 to accommodate multiple sections 18. A slit 58 extends from the main opening 54 to an outer edge 60 of retainer 52 to insert the main section of the fishing rod between the reel and eyelet. As previously explained, it is contemplated that this slit be permanently sealed after mounting the retainer on the main section 12. A plurality of slits 62 extend from the plurality of openings 56 to the outer edge 60 of retainer 52 to allow the insertion of each section of the multi-section fishing rod therein. These slits are not to be sealed closed, but are intended to allow easy insertion and removal of each section into the rod retainer.

FIG. 7 shows a retainer 64 similar to retainer 26 of FIG. 2. Opening 66 is provided to slide over the far end of main section 12 and remain there permanently. A plurality of openings 68, each having a slit 70 to an outer edge 72 correspond to the plurality of openings 56 of retainer 52 of FIG. 6. In this manner, an opening is provided in each retainer 52, 56 for each additional section of the multi-section fishing rod.

As can be seen in FIG. 1, retainers 24 and 26 do not interfere with fishing line 22, nor with reel 14. Likewise, the retainers of the present invention can be used equally well on casting rods or on fly-rods. In either case, the retainers will not interfere with the line and with normal use.

In a preferred embodiment, each of the retainers are comprised of pliable rubber so that the sections 18 can be easily inserted through the slits of the retainers. Further, the pliable rubber is capable of accepting fishing rod sections of various diameters and still maintain a firm fit. The pliable rubber also grips the fishing rod sections to maintain a firm fit even when not in use, as shown in FIG. 1. This avoids the retainers from sliding uncontrollably about the main section 12 and causing a distraction while fishing.

As is evident, there is no requirement that every opening have a corresponding rod section. In other words, the embodiment shown in FIGS. 6 and 7 is capable of receiving the main section in openings 54 and 66, and five sections in the plurality of openings 56 and 68. However, these same retainers can be used with fishing rods having only three additional sections, leaving the additional openings empty.

It is recognized that there are equivalents, alternatives, and modifications that are possible, aside from those expressly stated, that are within the scope of the appending claims.

I claim:

1. Retainers for storing and transporting a disassembled multi-sectioned fishing rod wherein one section is disengageable from a main section and capable of adjacent, parallel alignment with the main section, comprising:

a first retainer having a unitary, one-piece and substantially circular construction and a plurality of openings therein, each opening capable of receiving one of a main section and at least one other section of the fishing rod, the first retainer having a gapless slit from each opening to an outer edge of the first retainer, such that one opening of the first retainer is capable of receiving the main section between a reel mounted on the main section and a fishing line eyelet on the main section, wherein the first retainer is capable of completely encircling the main section and another opening of the first retainer is capable of receiving the at least one other section of the fishing rod; and a second one-piece retainer having a plurality of openings capable of receiving the main section and the at least one other section of the fishing rod therein.

2. The retainers of claim 1 wherein the fishing rod has a plurality of eyelets and a fishing line threaded therethrough and the disassembled sections are held firmly in place with the first and second retainers without the need to unthread the fishing line from the eyelets of the fishing rod.

3. The retainers of claim 1 wherein the first and second retainers are permanently attached to the main section and the assembled fishing rod is capable of uninhibited use with the retainers attached thereto.

4. The retainers of claim 3 wherein the slit of one opening in the first retainer is permanently sealed after receiving the main section therethrough and the fishing rod has a fishing line that is not impaired during use.

5. The retainers of claim 4 wherein the permanently sealed slit is glued.

6. The retainers of claim 1 wherein the fishing rod has a main section and more than one disengageable section, each disengageable section disengageable from a previous section, and all sections are capable of adjacent, parallel alignment with the main section, wherein the first and second retainers comprise an opening for each disengageable section to hold all sections together for storage and transport without the need to unthread a fishing line.

7. The retainers of claim 1 wherein the first and second retainers are composed of rubber.

8. The retainers of claim 1 wherein the openings of the first and second retainers are fully closed when a respective fishing rod section is received therein.

9. The retainers of claim 1 wherein the second retainer has a slit from at least one opening to an outer edge of the second retainer, such that the slit allows insertion of the at least one other section within the opening, and another opening is capable of receiving an end of the main section therein.

10. The retainers of claim 1 wherein the adjacent, parallel aligned sections of the disassembled fishing rod each have a distal end capable of receiving the second retainer thereover.

11. The retainers of claim 1 wherein the first and second retainers are made of rubber and the slits are closeable about the main rod section thereby avoiding entanglement of fishing rod line with the retainers, and wherein the retainers may be permanently attached to the fishing rod.

* * * * *